Patented June 14, 1938

2,120,410

UNITED STATES PATENT OFFICE 2,120,410

YEAST NUTRIMENT CONTAINING LIVER OIL AND METHOD OF MANUFACTURING THE SAME

Matajiro Kawata, Denen Chofu, Omori-ku, Tokyo, Japan, assignor to Kabushiki Kaisha Wakamoto Honpo Eiyo To Ikuji No Kai, Tokyo, Japan, a corporation of Japan No Drawing. Application October 19, 1936, Serial No. 106,488

3 Claims. (Cl. 99—97)

This invention relates to yeast nutriment containing liver oil and a method of manufacturing the same, characterized by impregnating with liver oil the seed albuminous matter obtained by removing fatty oil from edible fatty oil-containing vegetable seeds as completely as possible, holding the same at about 50–60° C. after mixed with aqueous solution of sugar and yeast and thus turning the mixture into a semi-fluid form by the self-digestion of the yeast, next mixing it with powder of fragrant dried yeast and then drying the same. The object of this invention is to obtain a nutriment retaining the effective ingredient of liver oil effectively which is freed from secondary reaction by the suitable mixture of liver oil and yeast and which does not change its quality and is not only easy to digest and absorb, but also is flavorous and palatable and accordingly does not give any disagreeable feeling in taking.

The liver oil being rich in vitamins A, D, etc., has been early known as an effective tonic. However, it has such defects that it is not only unpleasant to take owing to its offensive smell and strong viscosity, but also when taken too much, is apt to cause various kinds of troubles to one's health. Yeast contains vitamin B and other effective ingredients of nutritious value. Especially, the self-digested one contains nuclein, tryptophane and other amino acid phosphatide and other nutritious elements in such a form as can be absorbed into the vital body, but is easily attacked by a putrefying bacteria during or after the operation of the self-digestion and therefore does not only need great care and attention in an industrial operation, but also its product is very difficult to be preserved. Now, according to the present invention, such defects may be obviated completely. That is to say, if the powder of the liver oil adsorbed upon defatted vegetable seeds is self-digested by the addition of yeast, it is dispersed uniformly and prevents the growth of a putrefying bacteria, thus effecting the self-digestion safely and at the same time losing much of the peculiar disagreeable smell, and if the semi-fluid matter thus produced is coated by dried yeast, it changes into an easily-drying form and after dried, has excellent flavor.

The following is a detailed explanation of an example of performing this invention:—

After removing a portion of the oil from soy bean by pressing, extract it well further with ether until there is hardly any more fatty oil left in the extracted residue. Adding about 30 grams of liver oil slowly at the room temperature to about 100 grams of the extracted residue thus obtained (albuminous fine powder of soy bean), stir the mixture, and the liver oil will be absorbed by said powder of soy bean and be turned into almost a dry state.

Next, add the powdered liver oil thus obtained to a mixture consisting of 20 grams of sugar, 50 grams of water and 10 grams of yeast and maintain the same at 50–60° C. so that yeast may digest itself and be changed into a semi-fluid condition. After leaving it to be cooled down to a suitable temperature, pour small drops or narrow streams of the above semi-fluid matter, which contains liver oil and the product of the self-digestion of yeast, into the hygroscopic and fragrant powder prepared by heating 200 grams of dried yeast at 80–100° C., while stirring the latter. Dry the small granules thus produced and shape them into suitable pills or tablets as they are or after mixed with a suitable other nutriment or condiment.

As the product of this invention does not employ either high temperature or a medicine, it keeps effectively vitamins A and D contained in the liver oil and also the poison which would be produced by over-taking of the liver oil is neutralized by the action of yeast, so that it jointly with other nutrimental ingredients shows very great nutritious value. Moreover, the albuminous vegetable seeds serve to remedy its bad odour and taste all the more effectively, and the sugar and the product of the self-digestion of yeast remove the disagreeable taste and smell of the liver oil more securely and completely. Further, in this method, the liver oil together with albuminous powder of vegetable seeds constitutes the nucleus of each of the granules and is coated by dried yeast. Consequently, it has no apprehension of coming into contact with the air and accordingly this product can stand long preservation on account of the vitamin A contained in the liver oil maintaining its effect for a long duration of time. Besides, it is free from any offensive smell and therefore gives no unpleasant feeling in taking. Especially, having the form to be absorbed into the human body very easily, it is very suitable as a nutriment.

What is claimed is:

1. Method of manufacturing yeast nutriment containing liver oil which consists in extracting oil from soy beans, impregnating the residue with liver oil, adding a sugar solution and yeast to the impregnated residue, maintaining the mixture at a temperature of 50 to 60° C. to autolyze the yeast, into a semi-fluid state, mixing the product with dried yeast powder and finally drying the product.

2. Method of manufacturing yeast nutriment containing liver oil which consists in extracting oil from the soy bean, pulverizing the residue, impregnating the pulverized residue with liver oil, adding sugar, yeast and water to the empregnated powder, maintaining the mixture at a temperature of 50° to 60° C. to autolyze the yeast into a semi-fluid state, pouring small drops of the product into dried yeast powder to coat the drops therewith, and finally drying the drops.

3. Yeast nutriment containing liver oil comprising yeast coated drops consisting of a mixture of powdered defatted soy beans impregnated with liver oil, sugar and autolyzed yeast.

MATAJIRO KAWATA.